US012643552B2

(12) United States Patent
Janampally et al.

(10) Patent No.: US 12,643,552 B2
(45) Date of Patent: Jun. 2, 2026

(54) SYSTEMS AND METHODS FOR MAINTAINING VEHICLE SPEED DURING ROAD GRADE CHANGES

(71) Applicant: TOYOTA MOTOR ENGINEERING & MANUFACTURING NORTH AMERICA, INC., Plano, TX (US)

(72) Inventors: Sandeep Kumar Reddy Janampally, Canton, MI (US); Alejandro M. Sanchez, Ann Arbor, MI (US); Motonori Kimura, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 121 days.

(21) Appl. No.: 16/574,972

(22) Filed: Sep. 18, 2019

(65) Prior Publication Data

US 2021/0078584 A1     Mar. 18, 2021

(51) Int. Cl.
B60W 40/076 (2012.01)
B60W 30/18 (2012.01)

(52) U.S. Cl.
CPC .... B60W 40/076 (2013.01); B60W 30/18072 (2013.01); B60W 2510/106 (2013.01); B60W 2520/28 (2013.01); B60W 2540/103 (2013.01)

(58) Field of Classification Search
CPC ......... B60W 40/076; B60W 30/18072; B60W 2510/106; B60W 2520/28; B60W 2540/103
See application file for complete search history.

(56) References Cited

U.S. PATENT DOCUMENTS

| | | | | |
|---|---|---|---|---|
| 2014/0109717 A1* | 4/2014 | Maruyama | ............... | G05G 1/40 |
| | | | | 74/513 |
| 2015/0066335 A1* | 3/2015 | Kishi | .................. | F02D 41/2416 |
| | | | | 701/103 |
| 2016/0009277 A1* | 1/2016 | Kava | ..................... | B60W 10/06 |
| | | | | 701/22 |
| 2016/0280204 A1* | 9/2016 | Lian | ...................... | B60W 10/06 |
| 2017/0080931 A1* | 3/2017 | D'Amato | ............ | F16H 61/0213 |
| 2017/0297563 A1* | 10/2017 | Kava | ..................... | G01C 21/26 |
| 2018/0043793 A1* | 2/2018 | Herb | ..................... | B60W 10/08 |
| 2018/0105158 A1* | 4/2018 | Namuduri | ........... | B60W 40/076 |

(Continued)

*Primary Examiner* — Toya Pettiegrew
(74) *Attorney, Agent, or Firm* — HAYNES AND BOONE, LLP

(57) ABSTRACT

A system for dynamically maintaining a vehicle speed during a change in road grade comprises a first sensor configured to detect a depression amount of an accelerator pedal and a second sensor configured to monitor the vehicle speed. The system further comprises a vehicle speed control module configured to: receive an indication that the accelerator pedal is depressed; receive an indication of the vehicle speed; determine that the pedal has been depressed within a threshold amount for a threshold time period; determine that the vehicle speed has been maintained within a threshold for the threshold time period; determine whether the change in the road grade is less than a threshold grade; and, based on a determination that the change in the road grade is less than the threshold, automatically adjust a load on a power source of the vehicle to maintain the vehicle speed during the change in road grade.

19 Claims, 5 Drawing Sheets

200

202 — RECEIVE, BY A FIRST SENSOR OF A VEHICLE, AN INDICATION THAT AN ACCELERATOR PEDAL OF THE VEHICLE IS DEPRESSED

204 — DETERMINE, BY A VEHICLE SPEED CONTROL MODULE, THAT THE ACCELERATOR PEDAL HAS BEEN DEPRESSED WITHIN A THRESHOLD DEPRESSION AMOUNT FOR A THRESHOLD TIME

206 — RECEIVE, BY A SECOND SENSOR OF THE VEHICLE, AN INDICATION OF A VEHICLE SPEED

208 — DETERMINE, BY THE VEHICLE SPEED CONTROL MODULE, THAT THE VEHICLE SPEED HAS BEEN MAINTAINED WITHIN A THRESHOLD SPEED FOR THE THRESHOLD TIME

210 — DETERMINE, BY THE VEHICLE SPEED CONTROL MODULE, WHETHER THE CHANGE IN THE ROAD GRADE IS LESS THAN A THRESHOLD GRADE

212 — BASED ON A DETERMINATION THAT THE CHANGE IN THE ROAD GRADE IS LESS THAN THE THRESHOLD GRADE, AUTOMATICALLY ADJUST, BY THE VEHICLE SPEED CONTROL MODULE, A LOAD ON A POWER SOURCE OF THE VEHICLE TO MAINTAIN THE VEHICLE SPEED DURING THE CHANGE IN THE ROAD GRADE

(56) References Cited

U.S. PATENT DOCUMENTS

| | | | |
|---|---|---|---|
| 2019/0061527 A1* | 2/2019 | Hassani | B60K 31/0066 |
| 2019/0389510 A1* | 12/2019 | Ogawa | B62D 6/10 |
| 2020/0062238 A1* | 2/2020 | Hawley | B60W 10/08 |
| 2020/0353925 A1* | 11/2020 | Kim | B60W 40/08 |
| 2021/0047976 A1* | 2/2021 | Beinborn | F02D 41/1446 |
| 2022/0349467 A1* | 11/2022 | Hirasako | F16H 59/44 |

* cited by examiner

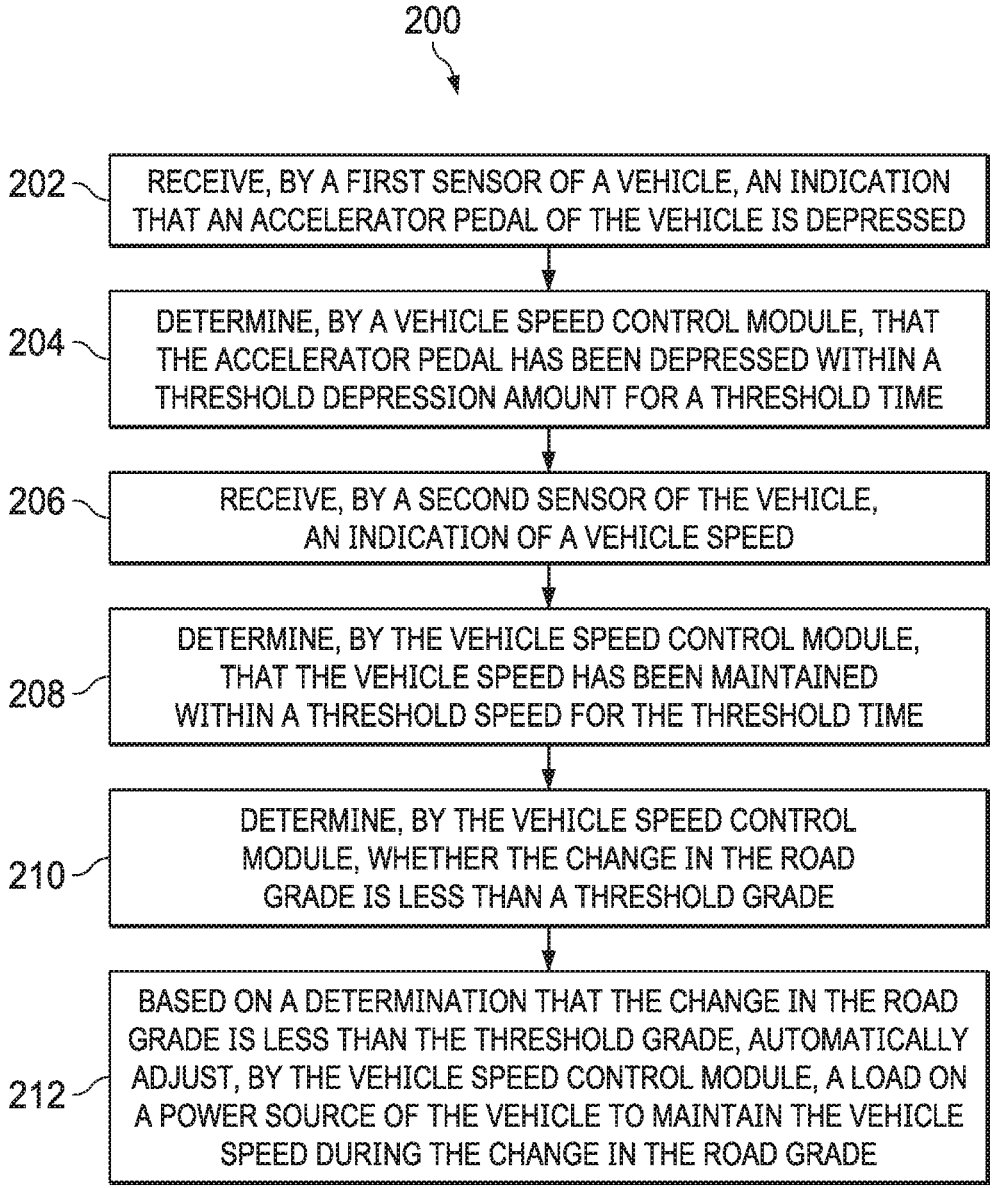

200

202 — RECEIVE, BY A FIRST SENSOR OF A VEHICLE, AN INDICATION THAT AN ACCELERATOR PEDAL OF THE VEHICLE IS DEPRESSED

204 — DETERMINE, BY A VEHICLE SPEED CONTROL MODULE, THAT THE ACCELERATOR PEDAL HAS BEEN DEPRESSED WITHIN A THRESHOLD DEPRESSION AMOUNT FOR A THRESHOLD TIME

206 — RECEIVE, BY A SECOND SENSOR OF THE VEHICLE, AN INDICATION OF A VEHICLE SPEED

208 — DETERMINE, BY THE VEHICLE SPEED CONTROL MODULE, THAT THE VEHICLE SPEED HAS BEEN MAINTAINED WITHIN A THRESHOLD SPEED FOR THE THRESHOLD TIME

210 — DETERMINE, BY THE VEHICLE SPEED CONTROL MODULE, WHETHER THE CHANGE IN THE ROAD GRADE IS LESS THAN A THRESHOLD GRADE

212 — BASED ON A DETERMINATION THAT THE CHANGE IN THE ROAD GRADE IS LESS THAN THE THRESHOLD GRADE, AUTOMATICALLY ADJUST, BY THE VEHICLE SPEED CONTROL MODULE, A LOAD ON A POWER SOURCE OF THE VEHICLE TO MAINTAIN THE VEHICLE SPEED DURING THE CHANGE IN THE ROAD GRADE

Fig. 2

SYSTEMS AND METHODS FOR MAINTAINING VEHICLE SPEED DURING ROAD GRADE CHANGES

TECHNICAL FIELD

The present disclosure relates generally to maintaining a speed of a vehicle during a change in road grade and, more particularly, to dynamically maintaining vehicle speed without receiving a user input to initiate a vehicle speed monitoring system.

BACKGROUND

When a road changes grade, drivers are not able to maintain a constant vehicle speed to adjust for the changing road grade. Thus, the vehicle speed will decrease when the road grade is positive (i.e., the vehicle is traveling uphill), and the vehicle speed will increase when the road grade is negative (i.e., the vehicle is traveling downhill). These fluctuations in vehicle speed cause drivers significant inconvenience during their daily commute, for example. A decrease in vehicle speed can lead to increases in traffic. An increase in vehicle speed can also lead to increases in traffic as well as speeding tickets. Existing vehicles lack the ability to automatically maintain a constant speed during a daily commute without the activation of cruise control. However, drivers typically do not use cruise control during their daily commute or in other high-traffic situations. It would therefore be desirable to enable a vehicle to automatically maintain a constant speed during one or more changes in road grade. Thus, an apparatus, system, and/or method is needed that addresses one or more of the foregoing issues, and/or one or more other issues.

SUMMARY

The present disclosure provides systems and methods for maintaining a vehicle speed during a change in road grade. A generalized system for dynamically maintaining a vehicle speed during a change in road grade includes a first sensor configured to detect an amount of depression of an accelerator pedal of a vehicle. The system further includes a second sensor configured to monitor the vehicle speed. The system further includes a vehicle speed control module. The vehicle speed control module is configured to receive, by the first sensor, an indication that the accelerator pedal is depressed. The vehicle speed control module is further configured to receive, by the second sensor, an indication of the vehicle speed. The vehicle speed control module is further configured to determine that the accelerator pedal has been depressed within a threshold depression amount for a threshold time period. The vehicle speed control module is further configured to determine that the vehicle speed has been maintained within a threshold speed for the threshold time period. The vehicle speed control module is further configured to determine whether the change in the road grade is less than a threshold grade. The vehicle speed control module is further configured to, based on a determination that the change in the road grade is less than the threshold grade, automatically adjust a load on a power source of the vehicle to maintain the vehicle speed during the change in the road grade.

A generalized system for dynamically maintaining a vehicle speed during a change in road grade includes a server configured to store information related to the road grade detected at different locations along a road. The system further includes a vehicle. The vehicle includes a first sensor configured to detect an amount of depression of an accelerator pedal of the vehicle. The vehicle further includes a second sensor configured to monitor the vehicle speed. The vehicle further includes a vehicle speed control module configured to determine that the accelerator pedal has been depressed within a threshold depression amount for a threshold time period. The vehicle speed control module is further configured to determine that the vehicle speed has been maintained within a threshold speed for the threshold time period. The vehicle speed control module is further configured to automatically adjust a load on a power source of the vehicle to maintain the vehicle speed during the change in the road grade. The vehicle speed control module is further configured to monitor changes in the vehicle speed in real time. The vehicle speed control module is further configured to compare the changes in the vehicle speed with the detected road grade at the different locations along the road to verify an accuracy of the detected road grade. The vehicle speed control module is further configured to, based on the comparison, transmit updated road grade information to the server.

A generalized method for dynamically maintaining a vehicle speed during a change in road grade includes receiving, by a first sensor of a vehicle, an indication that an accelerator pedal of the vehicle is depressed. The method further includes determining, by a vehicle speed control module, that the accelerator pedal has been depressed within a threshold depression amount for a threshold time period. The method further includes receiving, by a second sensor of the vehicle, an indication of the vehicle speed. The method further includes determining, by the vehicle speed control module, that the vehicle speed has been maintained within a threshold speed for the threshold time period. The method further includes determining, by the vehicle speed control module, whether the change in the road grade is less than a threshold grade. The method further includes, based on a determination that the change in the road grade is less than the threshold grade, automatically adjusting, by the vehicle speed control module, a load on a power source of the vehicle to maintain the vehicle speed during the change in the road grade.

BRIEF DESCRIPTION OF THE DRAWINGS

FIG. 2 is a flow chart illustration of a method of operating the system of FIG. 1 according to one or more embodiments of the present disclosure.

DETAILED DESCRIPTION

Figure 1:
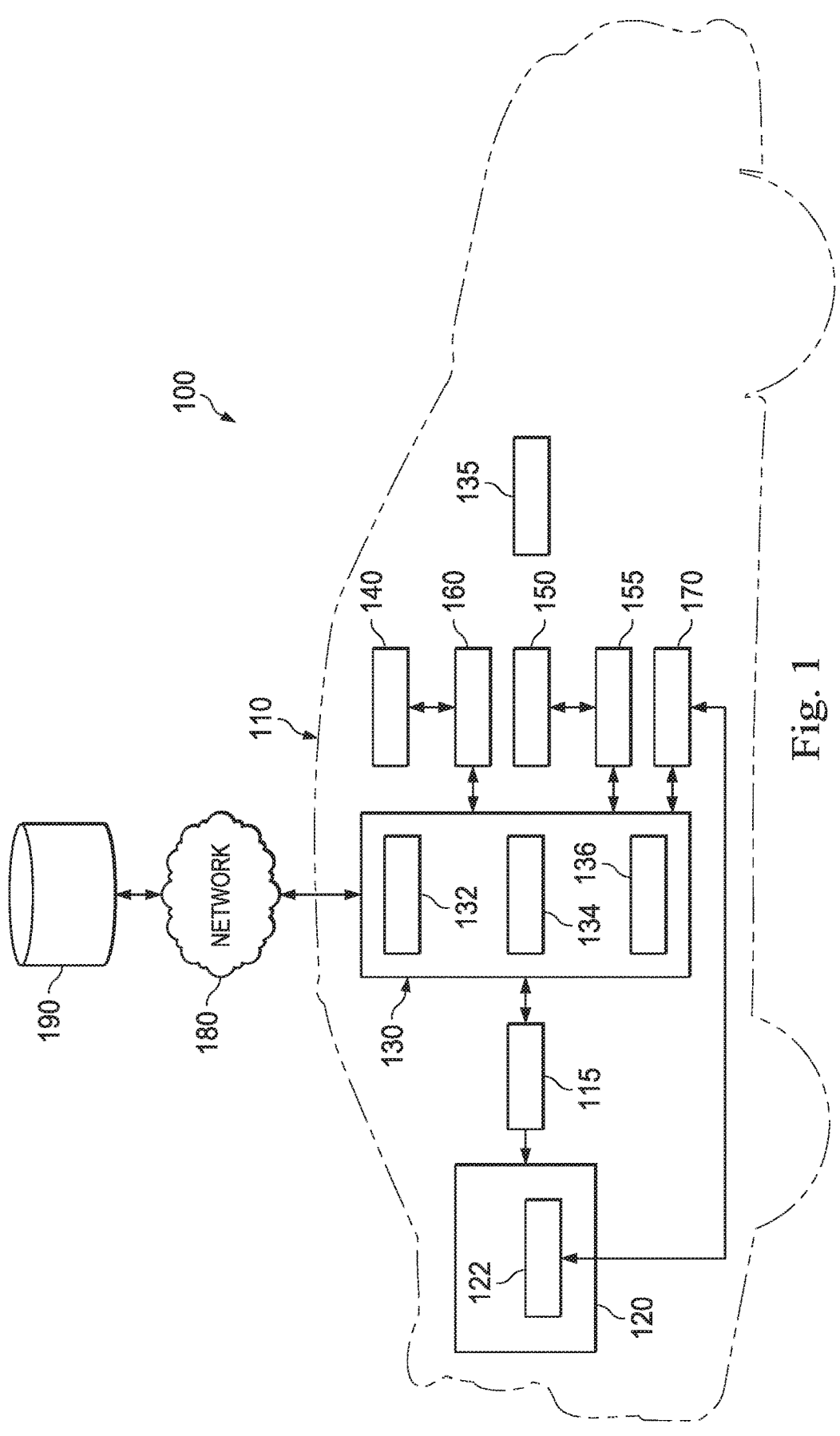
FIG. 1 is a diagrammatic illustration of a system for maintaining a vehicle speed during a change in road grade according to one or more embodiments of the present disclosure.

For the purposes of promoting an understanding of the principles of the invention, reference will now be made to certain implementations, or examples, illustrated in the drawings, and specific language will be used to describe the same. It will nevertheless be understood that no limitation of the scope of the invention is thereby intended. Any alterations and further modifications in the described implementations, and any further applications of the principles of the invention as described herein are contemplated as would normally occur to one skilled in the art to which the invention relates.

This disclosure describes illustrative systems for maintaining a vehicle speed during a change in road grade. In the system, a vehicle speed control module is used to maintain a constant vehicle speed when the grade of the road on which the vehicle is traveling increases or decreases within a certain threshold. The load (which may be torque, power, braking pressure, etc.) on a power source of the vehicle, such as an engine or motor, is adjusted automatically, without the need for an adjusted user input, to maintain the constant vehicle speed. Thus, the vehicle speed control module may act as a type of automatic cruise control in certain situations. The vehicle speed control module may activate a vehicle speed compensation mode (which may also be referred to as a vehicle speed control mode) after the vehicle speed control module determines that an accelerator pedal of the vehicle has been depressed within a threshold depression amount for a threshold amount of time and/or that the speed of the vehicle has been maintained within a threshold speed for a threshold amount of time. After the vehicle speed control mode is activated, the vehicle speed control module automatically adjusts the load on the motor or engine to maintain a constant vehicle speed after the vehicle speed control module determines that the grade of the road has changed. It is an advantage of the system that the vehicle speed control mode is dynamically activated based on the amount of road grade change to prevent an undesirable accelerator pedal depression to road grade relationship. Thus, for low grades, the vehicle speed control module automatically adjusts the load on the motor or engine. For mid-grades, the vehicle speed control module adjusts the load on the motor or engine after receiving an indication that the accelerator pedal (or the brake pedal when the grade is negative) has been further depressed. For high grades, the vehicle speed control mode is not activated. In some examples, the vehicle speed control mode is deactivated when the accelerator pedal is depressed by an amount outside of the threshold depression amount.

FIG. 1 is a diagrammatic illustration of an illustrative system for maintaining a vehicle speed during a change in road grade according to one or more embodiments of the present disclosure. In at least one such embodiment, as illustrated in FIG. 1, the system is generally referred to by the reference numeral 100 and includes a vehicle 110, a cloud server 180, and a road grade database 190. In the embodiment of FIG. 1, the vehicle 110 includes a power source 115, a transmission 120, a vehicle speed control module 130, an accelerator pedal 140, a brake pedal 150, an accelerator pedal sensor 160 (which may also be referred to as a first sensor), a vehicle speed sensor 170 (which may also be referred to as a second sensor), and a brake pedal sensor 155. The power source 115 may be an internal combustion engine, an electric engine (which may also be referred to as an electric motor), or other power source. The power source 115 may be mechanically and/or communicatively coupled to the transmission 120. The transmission 120 includes an output shaft 122. In some instances, such as in some electric vehicle embodiments, the transmission 120 is not a part of the vehicle 110. The vehicle speed control module 130 includes a receiver 132, a transmitter 134, and a processor 136. The processor 136 may activate and deactivate a vehicle speed control mode. When the vehicle speed control mode is activated, the vehicle speed control module 130 continues to monitor the environmental conditions surrounding the vehicle to determine if there are any changes in the grade of the road on which the vehicle 110 is traveling. When a change in road grade is detected, the vehicle speed control module 130 automatically adjusts the load on the power source 115 to maintain the speed of the vehicle 110 during the change in road grade. In several embodiments, the speed of the vehicle 110 may be maintained by maintaining a speed of the output shaft 122. The activation and deactivation of the vehicle speed control mode will be discussed in greater detail below. The accelerator pedal sensor 160, the vehicle speed sensor 170, and the brake pedal sensor 155 are each operably coupled to, and adapted to be in communication with, the vehicle speed control module 130. The accelerator pedal sensor 160 is also operably coupled to, and adapted to be in communication with, the accelerator pedal 140. The vehicle speed sensor 170 is also operably coupled to, and adapted to be in communication with, the power source 115, the transmission 120, the output shaft 122, and/or any other component of the vehicle 110 that may be used to monitor the speed of the vehicle 110. The brake pedal sensor 155 is also operably coupled to, and adapted to be in communication with, the brake pedal 150. The vehicle speed control module 130 is operably coupled to, and adapted to be in communication with, the cloud server 180. Additionally, while FIG. 1 only illustrates the vehicle speed control module 130 in communication with the cloud server 180, it is to be understood that the vehicle speed control module 130 may also communicate with the road grade database 190.

In some embodiments, the accelerator pedal sensor 160 includes an electronic sensor to determine whether or not the accelerator pedal 140 is depressed and the amount by which the accelerator pedal 140 is depressed. For example, the accelerator pedal sensor 160 may include a voltage sensor, a capacitive sensor, an inductive sensor, etc. The accelerator pedal 140 may be depressed between 0% and 100%, with 100% depression occurring when the accelerator pedal 140 is fully pushed toward the floor of the vehicle 110. In several embodiments, when the accelerator pedal 140 is depressed, the accelerator pedal sensor 160 receives a signal indicating that a voltage has increased, for example. The voltage may start at 0V when the accelerator pedal 140 is 0% depressed, and then the voltage increases to a maximum voltage when the accelerator pedal is 100% depressed. An increase in voltage detected by the accelerator pedal sensor 160 indicates that the accelerator pedal 140 has been depressed. As the accelerator pedal 140 is depressed further, the voltage increases, and the accelerator pedal sensor 160 can determine how much the accelerator pedal 140 has been depressed based on the received voltage.

In several examples, the accelerator pedal sensor 160 may also be operably coupled to, and adapted to be in communication with, the brake pedal 150. In such examples, the accelerator pedal sensor 160 includes an electronic sensor to determine whether or not the brake pedal 150 is depressed and the amount by which the brake pedal 150 is depressed. It is to be understood that the discussion above with respect to the interaction between accelerator pedal sensor 160 and the accelerator pedal 140 similarly applies to the interaction between accelerator pedal sensor 160 and the brake pedal 150.

In some embodiments, the brake pedal sensor 155 includes a pressure sensor, for example, to determine whether or not the brake pedal 150 is depressed and the amount by which the brake pedal 150 is depressed. The brake pedal 150 may be depressed between 0% and 100%, with 100% depression occurring when the brake pedal 150 is fully pushed toward the floor of the vehicle 110. In several embodiments, when the brake pedal 150 is depressed, the brake pedal sensor 155 receives a signal indicating that a pressure has increased, for example. The pressure may start at 0 MPa when the brake pedal 150 is 0% depressed, and then the pressure increases to a maximum pressure when the brake pedal is 100% depressed. An increase in pressure detected by the brake pedal sensor 155 indicates that the brake pedal 150 has been depressed. As the brake pedal 150 is depressed further, the pressure increases, and the brake pedal sensor 155 can determine how much the brake pedal 150 has been depressed based on the received pressure.

The accelerator pedal sensor 160 is adapted to transmit data (e.g., data indicating whether the accelerator pedal 140 is depressed and the amount by which the accelerator pedal 140 has been depressed) to the vehicle speed control module 130. In several embodiments, the accelerator pedal sensor 160 transmits data to the vehicle speed control module 130 after the processor 136 activates the vehicle speed control mode, which will be discussed in greater detail below. In other embodiments, the accelerator pedal sensor 160 transmits data to the vehicle speed control module 130 in set, recurring time intervals. In still other embodiments, the accelerator pedal sensor 160 transmits data to the vehicle speed control module 130 when the accelerator pedal sensor 160 receives a signal indicating that the accelerator pedal 140 has been depressed.

The brake pedal sensor 155 is adapted to transmit data (e.g., data indicating whether the brake pedal 150 is depressed and the amount by which the brake pedal 150 has been depressed) to the vehicle speed control module 130. In several embodiments, the brake pedal sensor 155 transmits data to the vehicle speed control module 130 after the processor 136 activates the vehicle speed control mode. In other embodiments, the brake pedal sensor 155 transmits data to the vehicle speed control module 130 in set, recurring time intervals. In still other embodiments, the brake pedal sensor 155 transmits data to the vehicle speed control module 130 when the brake pedal sensor 155 receives a signal indicating that the brake pedal 150 has been depressed.

In some embodiments, the vehicle speed sensor 170 includes a sensor to determine the speed of the vehicle 110. The vehicle speed sensor 170 may include an output shaft speed sensor, a wheel speed sensor (e.g., a GPS unit, a camera, lidar, radar, etc.), a 3-axis G-sensor, a sensor to determine a roadload pedal difference, or any other suitable sensor. In several embodiments, when the speed of the vehicle 110 increases, the vehicle speed sensor 170 receives a signal indicating that the speed of the vehicle 110 has increased.

In several embodiments, the speed of the vehicle 110 changes when a grade of the road on which the vehicle 110 is traveling changes (i.e., increases or decreases). For clarity purposes only and not in any limiting manner, the discussion with respect to the following figures will be made with reference to the vehicle speed sensor 170 being an output shaft speed sensor. It is to be understood that in other examples, the vehicle speed sensor 170 may be any one or more of the exemplary sensors listed above. In further examples, the vehicle speed sensor 170 may be a sensor that is not one of the exemplary sensors listed above.

In some embodiments, the output shaft speed sensor 170 includes a sensor to determine the speed at which the output shaft 122 of the transmission 120 is rotating. For example, the output shaft speed sensor 170 may include an optical sensor, a Hall effect sensor, a magneto-resistive sensor, etc. In several embodiments, when the speed of the output shaft 122 increases, the output shaft speed sensor 170 receives a signal indicating that the speed of the output shaft 122 has increased. In addition, the output shaft speed sensor 170 determines the speed at which the output shaft 122 is rotating.

The output shaft speed sensor 170 is adapted to transmit data (e.g., data indicating the speed at which the output shaft 122 is rotating) to the vehicle speed control module 130. In several embodiments, the output shaft speed sensor 170 transmits data to the vehicle speed control module 130 after the processor 136 activates the vehicle speed control mode, which will be discussed in greater detail below. In other embodiments, the output shaft speed sensor 170 transmits data to the vehicle speed control module 130 in set, recurring time intervals. For example, the sensor 170 may transmit data to the vehicle speed control module 130 at a transmission frequency rate that may range from about one time per second to one time per minute. In some examples, the transmission frequency may be about one time every five seconds, one time every thirty seconds, or any other suitable interval of time. The transmission frequency provided herein is for example only, and other embodiments may include more frequent transmissions or less frequent transmissions. For example, in some implementations, the transmission frequency may be faster than one time per second or slower than one time per minute.

In some embodiments, the vehicle 110 also includes a GPS receiver 135. The GPS receiver 135 is adapted to record location data of the vehicle 110. In some embodiments, the location data may be used to determine the road grade for the geographic area where the vehicle 110 is located. This road grade data may be updated based on the detected speed of the output shaft 122, which will be discussed in greater detail below.

FIG. 2 is a flow chart illustration of a method of operating the system of FIG. 1 according to one or more embodiments of the present disclosure. In several embodiments, the vehicle speed control module 130 is used to maintain a constant vehicle speed when the grade of the road on which the vehicle 110 is traveling increases or decreases within a certain threshold. The load on the power source 115 is adjusted automatically to maintain the constant vehicle speed. The vehicle speed control module 130 may activate a vehicle speed compensation mode (which may also be referred to as a vehicle speed control mode) after the vehicle speed control module 130 determines that the accelerator pedal 140 of the vehicle 110 has been depressed within a threshold depression amount for a threshold amount of time and/or that a speed of the output shaft 122 of the transmission 120 of the vehicle 110 has been maintained within a threshold speed for a threshold amount of time. After the vehicle speed control mode is activated, the vehicle speed control module 130 automatically adjusts the load on the power source 115 to maintain the speed of the output shaft 122 after the vehicle speed control module 130 determines that the grade of the road has changed. By maintaining the speed of the output shaft 122, the vehicle speed control module 130 thereby maintains the speed of the vehicle 110.

In one such embodiment, as illustrated in FIG. 2, the method is generally referred to by the reference numeral 200 and includes at a step 202 receiving, by a first sensor of a vehicle, an indication that an accelerator pedal of the vehicle is depressed. At a step 204, during or after receiving an indication that the accelerator pedal 140 is depressed, a vehicle speed control module determines that the accelerator pedal 140 has been depressed within a threshold depression amount for a threshold time period. As discussed above, the accelerator pedal sensor 160 receives a signal indicating whether or not the accelerator pedal 140 is depressed and the amount by which the accelerator pedal 140 is depressed. In several examples, when the accelerator pedal sensor 160 receives a signal indicating that the accelerator pedal 140 is depressed, the accelerator pedal sensor 160 transmits a notification to the vehicle speed control module 130. The notification may be received by the receiver 132 of the vehicle speed control module 130. The transmitter 134 of the vehicle speed control module 130 may then output the notification to the processor 136 for further analysis and processing. In several embodiments, the transmitted notification may include the data regarding how much the accelerator pedal 140 has been depressed.

The processor 136 continues to monitor the signals received from the accelerator pedal sensor 160 to determine whether the accelerator pedal 140 has been depressed within a threshold depression amount for a threshold amount of time. In some embodiments, the vehicle speed control mode is activated after the processor 136 has determined that the accelerator pedal 140 has been depressed by a constant amount, within a threshold, for a set amount of time. To determine if there has been a constant accelerator pedal depression for a set amount of time, the processor 136 may monitor the signals received from the accelerator pedal sensor 160.

As discussed above, in some embodiments, the amount by which the accelerator pedal 140 has been depressed is monitored in terms of a voltage. For example, the accelerator pedal sensor 160 will receive a signal indicating a certain voltage when the accelerator pedal 140 is 10% depressed. The accelerator pedal sensor 160 will receive a signal indicating a higher voltage when the accelerator pedal 140 is 20% depressed, for example. As one example, the threshold depression amount for the accelerator pedal 140 may range from a depression percentage of 5%-10%. The threshold depression amount provided herein is for example only, and other embodiments may include lower or higher depression percentages. For example, in some implementations, the threshold depression amount may range from a depression percentage less than 5% to a depression percentage greater than 10%. In other embodiments, the threshold depression amount may range from any other suitable depression percentages. Because the depression percentage may be represented by a voltage, the threshold depression amount may range from 0.6V-0.8V. The threshold range of voltages provided herein is for example only, and other embodiments may include lower or higher voltages. For example, in some implementations, the threshold depression amount may range from a voltage less than 0.6V to a voltage greater than 0.8V. In other embodiments, the threshold depression amount may range from any other suitable voltages.

In some examples, the threshold amount of time for which the accelerator pedal 140 must be depressed within the threshold amount (i.e., held at a "constant" accelerator pedal output) discussed above is three seconds. The threshold time period provided herein is for example only, and other embodiments may include shorter or longer times. For example, in some implementations, the threshold time period may be less than three seconds (e.g., two seconds, one second, etc.) or greater than three seconds (e.g., four seconds, five seconds, etc.). The processor 136 of the vehicle speed control module 130 will activate the vehicle speed control mode only after the accelerator pedal 140 has been depressed within the threshold amount for at least the threshold amount of time.

At a step 206, before, during, or after determining that the accelerator pedal 140 has been depressed within a threshold depression amount for a threshold time period, a second sensor of the vehicle receives an indication of a speed of the vehicle. At a step 208, during or after the second sensor receives the indication of the speed of the vehicle 110, the vehicle speed control module determines that the speed of the vehicle has been maintained within a threshold speed for the threshold time period. As discussed above, the output shaft speed sensor 170 receives one or more signals indicating the speed at which the output shaft 122 is rotating. The speed at which the output shaft 122 is rotating may indicate the speed of the vehicle 110. In several examples, the sensor 170 transmits the detected output shaft speed data to the vehicle speed control module 130. The output shaft speed data may be received by the receiver 132 of the vehicle speed control module 130. The transmitter 134 may then output the output shaft speed data to the processor 136 for further analysis and processing.

The processor 136 continues to monitor the output shaft speed data received from the output shaft speed sensor 170 to determine whether the speed of the output shaft 122, and thus the speed of the vehicle 110, has been maintained within a threshold speed for a threshold amount of time. In some embodiments, the vehicle speed control mode is activated after the processor 136 has determined that the speed of the output shaft 122 has been maintained at a constant speed, within a threshold, for a set amount of time. To determine if the speed of the output shaft 122, and thus the speed of the vehicle 110, has been maintained at a constant speed for a set amount of time, the processor 136 may monitor the output shaft speed data received from the output shaft speed sensor 170.

As one example, the threshold speed for the output shaft 122 may range from 5 RPM to 20 RPM. The threshold speed provided herein is for example only, and other embodiments may include lower or higher speeds. For example, in some implementations, the threshold output shaft speed may range from a speed less than 5 RPM to a speed greater than 20 RPM. In other embodiments, the threshold output shaft speed may include a range of any other suitable output shaft speeds.

In some examples, the threshold amount of time for which the speed of the output shaft 122 must be maintained within the threshold speed discussed above is three seconds. The threshold time period provided herein is for example only, and other embodiments may include shorter or longer times. For example, in some implementations, the threshold time period may be less than three seconds (e.g., two seconds, one second, etc.) or greater than three seconds (e.g., four seconds, five seconds, etc.). The processor 136 of the vehicle speed control module 130 will activate the vehicle speed control mode only after the speed of the output shaft 122 has been maintained within the threshold speed for at least the threshold amount of time.

At a step 210, during or after determining that the accelerator pedal 140 has been depressed within a threshold depression amount for a threshold time period and determining that the speed of the vehicle 110 has been maintained within a threshold speed for the threshold time period, the vehicle speed control module 130 determines whether the change in the road grade is less than a threshold grade. The processor 136 of the vehicle speed control module 130 may make this determination based on a predicted road grade, a detected road grade, or any combination of the predicted and detected road grades. In some examples, the threshold grade may be 3% (e.g., a 3% increase in uphill grade from the current grade of the road on which the vehicle 110 is traveling). The threshold grade provided herein is for example only, and other embodiments may include smaller or larger grades. For example, in some implementations, the threshold grade may be less than 3% (e.g., 2%, 1%, etc.) or greater than 3% (e.g., 4%, 5%, etc.). In several examples, one percent of grade is substantially similar to one degree of grade. Thus, in some examples, a 3% change in road grade is substantially similar to a 3° change in road grade. The relationship between percentage of grade and degree of grade provided herein is for example only, and other embodiments may include different relationships. For example, in some implementations, the one percent of grade is substantially similar to a degree of grade less than one degree (e.g., 0.5°, 0.25°, etc.) or greater than one degree (e.g., 2°, 3°, etc.).

At a step 212, during or after determining that the accelerator pedal 140 has been depressed within a threshold depression amount for a threshold time period, determining that the speed of the vehicle 110 has been maintained within a threshold speed for the threshold time period, and determining that the change in the road grade is less than the threshold grade, the vehicle speed control module 130 automatically adjusts a load on a power source of the vehicle to maintain the speed of the vehicle during the change in the road grade. In examples when the road grade increases, the processor 136 of the vehicle speed control module 130 may automatically increase the load on the power source 115 to maintain the speed of the vehicle 110 during the change in the road grade. In other examples when the road grade increases, the processor 136 of the vehicle speed control module 130 may automatically decrease the load on the power source 115 to maintain the speed of the vehicle 110 during the change in the road grade. In examples when the road grade decreases, the processor 136 may automatically decrease the load on the power source 115 to maintain the speed of the vehicle 110 during the change in the road grade. In other examples when the road grade decreases, the processor 136 may automatically increase the load on the power source 115 to maintain the speed of the vehicle 110 during the change in the road grade.

In some examples, the processor 136 may increase the load on the power source 115, and thereby maintain the speed of the vehicle 110, by requesting a higher engine torque for vehicles with combustion engines. The processor 136 may additionally increase the load on the power source 115, and thereby maintain the speed of the vehicle 110, by requesting a higher battery output for vehicles with hybrid, electric, and fuel cell engines. The processor 136 may further increase the load on the power source 115, and thereby maintain the speed of the vehicle 110, by requesting a gear change and/or a gear ratio change. In addition, the processor 136 may increase the load on the power source 115, and thereby maintain the speed of the vehicle 110, by requesting a change in the lockup status (i.e., "on" or "off") for vehicles that have a torque converter. It is to be understood that the processor 136 may increase the load on the power source 115 in any other suitable manner.

Figure 3:
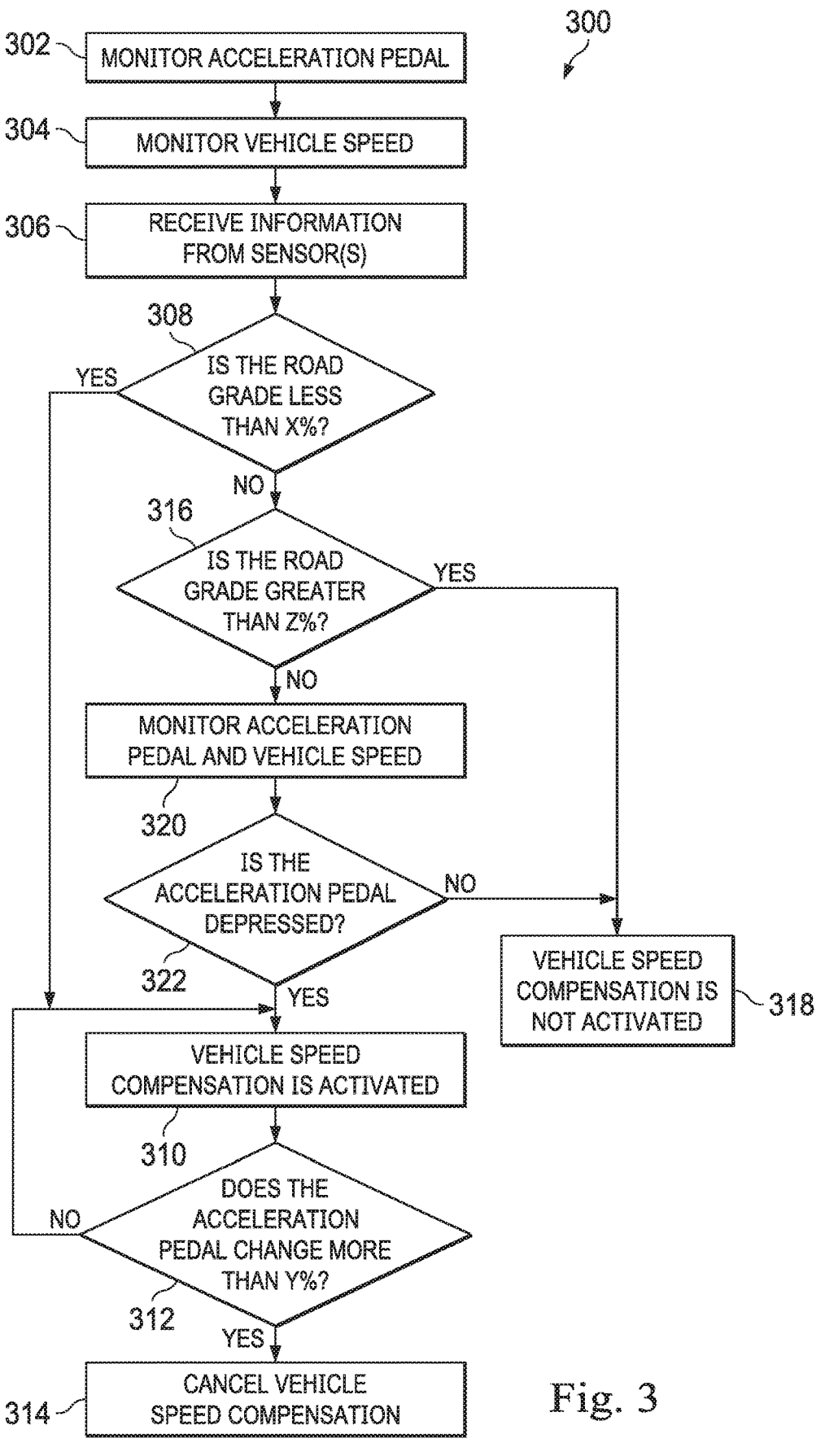
FIG. 3 is a flow diagram illustration of a method of operating the system of FIG. 1 when the road grade is a positive grade according to one or more embodiments of the present disclosure.

FIG. 3 is a flow diagram illustration of a method of operating the system of FIG. 1 when the road grade is a positive grade according to one or more embodiments of the present disclosure. In one such embodiment, as illustrated in FIG. 3, the method is generally referred to by the reference numeral 300 and is illustrated as a set of operations or steps 302 through 322 and is described with continuing reference to FIG. 1. Not all of the illustrated steps 302 through 322 may be performed in all embodiments of the method 300. Additionally, one or more steps that are not expressly illustrated in FIG. 3 may be included before, after, in between, or as part of the steps 302 through 322. In some embodiments, one or more of the steps 302 through 322 may be implemented, at least in part, in the form of executable code stored on non-transitory, tangible, machine-readable media that when run by one or more processors may cause the one or more processors to perform one or more of the processes. In one or more embodiments, the steps 302 through 322 may be performed by the vehicle speed control module 130 from FIG. 1.

In one embodiment, as illustrated in FIG. 3, the method is generally referred to by the reference numeral 300 and includes at a step 302 monitoring the acceleration pedal 140. As discussed above with respect to FIG. 2, the accelerator pedal sensor 160 receives a signal indicating whether or not the accelerator pedal 140 is depressed and the amount by which the accelerator pedal 140 is depressed. In several examples, when the accelerator pedal sensor 160 receives a signal indicating that the accelerator pedal 140 is depressed, the accelerator pedal sensor 160 transmits a notification to the vehicle speed control module 130. The notification may be received by the receiver 132 of the vehicle speed control module 130. The receiver 132 may then output the notification to the processor 136 for further analysis and processing. In several embodiments, the transmitted notification may include the data regarding how much the accelerator pedal 140 has been depressed.

The processor 136 continues to monitor the signals received from the accelerator pedal sensor 160 to determine whether the accelerator pedal 140 has been depressed within a threshold depression amount for a threshold amount of time. In some embodiments, the vehicle speed control mode is activated after the processor 136 has determined that the accelerator pedal 140 has been depressed by a constant amount, within a threshold, for a set amount of time. To determine if there has been a constant accelerator pedal depression for a set amount of time, the processor 136 may monitor the signals received from the accelerator pedal sensor 160.

In several embodiments, at a step 304 before, during, or after monitoring the accelerator pedal 140, the vehicle speed is monitored. In some examples, the vehicle speed is monitored by monitoring the speed of the output shaft 122. As discussed above with respect to FIG. 2, the output shaft speed sensor 170 receives one or more signals indicating the speed at which the output shaft 122 is rotating. In several examples, the sensor 170 transmits the detected output shaft speed data to the vehicle speed control module 130. The output shaft speed data may be received by the receiver 132 of the vehicle speed control module 130. The receiver 132 may then output the output shaft speed data to the processor 136 for further analysis and processing.

The processor 136 continues to monitor the output shaft speed data received from the output shaft speed sensor 170 to determine whether the speed of the output shaft 122 has been maintained within a threshold speed for a threshold amount of time. In some embodiments, the vehicle speed control mode is activated after the processor 136 has determined that the speed of the output shaft 122 has been maintained at a constant speed, within a threshold, for a set amount of time. To determine if the speed of the output shaft 122 has been maintained at a constant speed for a set amount of time, the processor 136 may monitor the output shaft speed data received from the output shaft speed sensor 170.

In several embodiments, at a step 306 before, during, or after monitoring the accelerator pedal 140 and/or monitoring the vehicle speed, information is received from one or more sensors. In some examples, the vehicle 110 includes one or more sensors to detect and/or predict the grade of the road. These sensors may include the GPS receiver 135 (discussed above with respect to FIG. 1), a G-sensor, an RPM sensor, and/or any other suitable sensor. The GPS receiver 135 may be used to determine the geographic location of the vehicle 110. The road grade may then be determined for that particular geographic location. For example, the road grade database 190 includes a listing of the road grades for each geographic location where the vehicle 110 could be located. The vehicle speed control module 130 can communicate with the road grade database 190, either directly or via the cloud server 180, to receive an indication of the road grade for the particular geographic location where the vehicle 110 is located. Other sensors, such as G-sensors and/or RPM sensors, may be used to detect the road grade based on measured driving conditions of the vehicle 110, for example. One or more of these other sensors may be used to supplement the road grade determined from the GPS data (which may be a predicted road grade). In this way, the detected road grade and the predicted road grade may be combined, and a composite road grade measurement may be determined. In some embodiments, this composite road grade measurement is more accurate than either of the detected road grade measurement or the predicted road grade measurement, alone.

In some embodiments, the processor 136 of the vehicle speed control module 130 in conjunction with one or more of the sensors in the vehicle 110 may be used to verify the accuracy of the predicted road grade for the geographic location of the vehicle 110. For example, the speed of the output shaft 122 may be monitored in real time. This real time data may then be compared with the predicted road grade data provided by the road grade database 190. If there is a discrepancy between the predicted road grade and the detected road grade (based on the output shaft speed measurements), the detected road grade data may be transmitted to the cloud server 180. In this way, the cloud server 180 and/or the road grade database 190 may be updated in real time to increase the accuracy of the road grade data in the road grade database 190. In some examples, the processor 136 verifies the accuracy of the predicted road grade from the road grade database 190 by comparing the speed of the output shaft 122 at the geographic location of the vehicle 110. If the predicted road grade indicates an increase in the grade, then the output shaft speed should decrease to reflect the fact that the vehicle 110 should now be traveling uphill. Similarly, if the predicted road grade indicates a decrease in the grade, then the output shaft speed should increase to reflect the fact that the vehicle 110 should now be traveling downhill. If a detected increase/decrease in the output shaft speed does not match with the expected performance of the speed of the output shaft 122 based on the predicted road grade data from the road grade database 190, then the road grade database 190 may be updated accordingly. The data in the road grade database 190 will be updated to match the detected road grade, based on the measured output shaft speed. This will allow the predicted road grade data in the road grade database 190 to be more accurate with respect to future road grade predictions.

In some examples, the vehicle 110 includes one or more additional sensors to detect the traffic conditions surrounding the vehicle 110. For example, the vehicle 110 may include a radar sensor, a camera sensor (or any other optical sensor), and/or a lidar sensor. Data from these sensors may be sent to the vehicle speed control module 130 to aid the vehicle speed control module 130 in determining when to adjust the load on the power source 115 to maintain the speed of the vehicle 110. In some embodiments, if the vehicle 110 is driving in light traffic or no traffic conditions, the vehicle speed control module 130 may not adjust the load on the power source 115 even if the vehicle 110 encounters a change in road grade. In such embodiments, the load on the power source 115 may not be adjusted because any fluctuations in vehicle speed due to the change in road grade would not negatively affect the traffic conditions because there are minimal traffic issues to begin with. Thus, in these exemplary conditions, the precise maintenance of the speed of the vehicle 110 may not be required. In other embodiments, if the vehicle 110 is driving in moderate to heavy traffic conditions, the vehicle speed control module 130 may adjust the load on the power source 115 if the vehicle 110 encounters a change in road grade. In such embodiments, the load on the power source 115 may be adjusted because any fluctuations in vehicle speed due to the change in road grade may negatively affect the traffic conditions in which the vehicle 110 is driving. Thus, in these exemplary conditions, maintaining the speed of the vehicle 110 is important.

In several embodiments, at a step 308 during or after receiving information from the one or more sensors, the processor 136 of the vehicle speed control module 130 determines whether the change in road grade is less than a threshold grade. The processor 136 may make this determination based on the predicted road grade, the detected road grade, or any combination of the predicted and detected road grades. In some examples, the threshold grade may be 3% (i.e., a 3% increase in uphill grade from the current grade of the road on which the vehicle 110 is traveling). The threshold grade provided herein is for example only, and other embodiments may include smaller or larger grades. For example, in some implementations, the threshold grade may be less than 3% (e.g., 2%, 1%, etc.) or greater than 3% (e.g., 4%, 5%, etc.).

In some embodiments, at a step 310 after determining that the change in road grade is less than the threshold grade, the processor 136 activates the vehicle speed compensation mode (which may also be referred to as the vehicle speed control mode). In several examples, when the vehicle speed compensation mode is activated, the vehicle speed control module 130 continues to monitor the environmental conditions surrounding the vehicle to determine if there are any changes in the grade of the road on which the vehicle 110 is traveling. When a change in road grade is detected, the vehicle speed control module 130 automatically adjusts the load on the power source 115 to maintain the speed of the vehicle 110 during the change in road grade. In examples when the road grade increases, as illustrated by the embodiment shown in FIG. 3, the processor 136 may automatically increase the load on the power source 115 to maintain the speed of the output shaft 122, which maintains the speed of the vehicle 110 during the change in the road grade.

In several examples, at a step 312 while the vehicle speed control mode is activated, the processor 136 determines whether the accelerator pedal 140 is depressed by an amount greater than the threshold depression amount. As discussed above, in some examples, the threshold depression amount for the accelerator pedal 140 may be between 15% and 20%. In such examples, the processor 136 continuously monitors the depression amount of the accelerator pedal 140 to determine if the depression amount exceeds 20%. If the depression amount remains within the threshold depression amount, the process returns to step 310.

In some embodiments, at a step 314 after determining that the accelerator pedal 140 is depressed by an amount greater than the threshold depression amount, the processor 136 deactivates the vehicle speed compensation mode.

In alternative embodiments, the processor 136 determines whether the accelerator pedal 140 is depressed by an amount less than the threshold depression amount. As discussed above, in some examples, the threshold depression amount for the accelerator pedal 140 may be between 15% and 20%. In such examples, the processor 136 continuously monitors the depression amount of the accelerator pedal 140 to determine if the depression amount falls below 15%. After determining that the accelerator pedal 140 is depressed by an amount less than the threshold depression amount, the processor 136 deactivates the vehicle speed compensation mode.

In several examples, at a step 316 after determining that the change in road grade is greater than the threshold grade, the processor 136 of the vehicle speed control module 130 determines whether the change is road grade is greater than a second threshold grade. In some embodiments, the second threshold grade is greater than the threshold grade discussed above. For example, if the threshold grade is 3%, the second threshold grade may be 4%. The threshold grade and the second threshold grade provided herein are for example only, and other embodiments may include smaller or larger grades. For example, in implementations when the threshold grade is 3%, the second threshold grade may be less than 4% (e.g., 3.5%, 3.75%, etc.) or greater than 4% (e.g., 5%, 6%, etc.).

In some embodiments, at a step 318 after determining that the change in road grade is greater than the second threshold grade, the processor 136 does not activate the vehicle speed control mode. In such embodiments, the change in road grade is too steep to merit activation of the vehicle speed control mode.

In several embodiments, at a step 320 after determining that the change in road grade is less than the second threshold grade, the processor 136 monitors the acceleration pedal 140 and the speed of the vehicle 110. As discussed above, the processor 136 may monitor the speed of the vehicle 110 by monitoring the speed of the output shaft 122. As further discussed above, the processor 136 may monitor the acceleration pedal 140 to determine if the accelerator pedal 140 is depressed and, if so, the amount of such depression.

In some examples, at a step 322 during or after monitoring the accelerator pedal 140, the processor determines whether the accelerator pedal 140 has been depressed by any amount. In examples where the accelerator pedal 140 has not been depressed, the processor 136 does not activate the vehicle speed control mode. In examples where the accelerator pedal 140 has been depressed, the processor 136 activates the vehicle speed control mode, and the method 300 proceeds to step 310.

Figure 4:
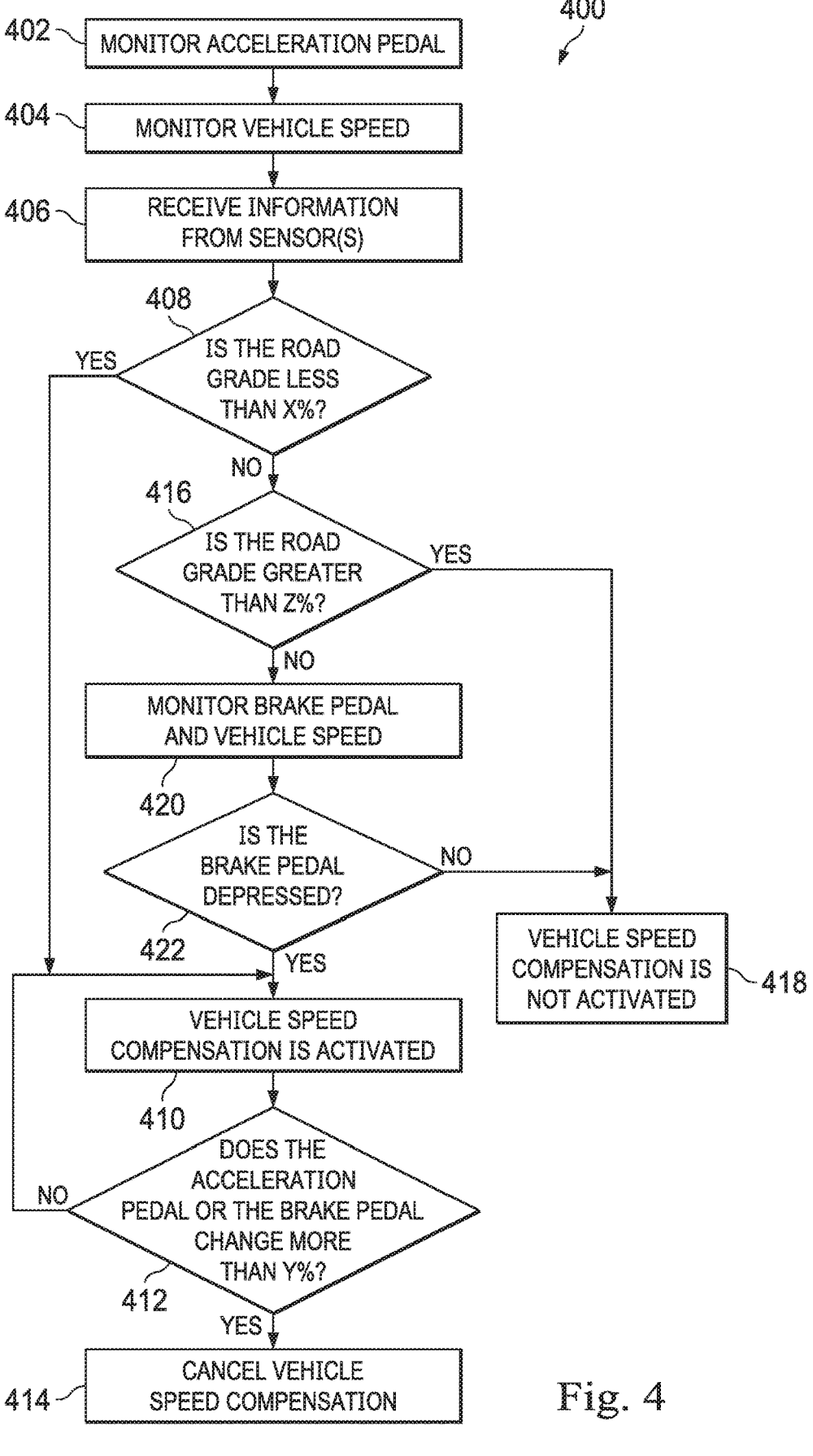
FIG. 4 is a flow diagram illustration of a method of operating the system of FIG. 1 when the road grade is a negative grade according to one or more embodiments of the present disclosure.

FIG. 4 is a flow diagram illustration of a method of operating the system of FIG. 1 when the road grade is a negative grade according to one or more embodiments of the present disclosure. In one such embodiment, as illustrated in FIG. 4, the method is generally referred to by the reference numeral 400 and is illustrated as a set of operations or steps 402 through 422 and is described with continuing reference to FIG. 1. Not all of the illustrated steps 402 through 422 may be performed in all embodiments of the method 400. Additionally, one or more steps that are not expressly illustrated in FIG. 4 may be included before, after, in between, or as part of the steps 402 through 422. In some embodiments, one or more of the steps 402 through 422 may be implemented, at least in part, in the form of executable code stored on non-transitory, tangible, machine-readable media that when run by one or more processors may cause the one or more processors to perform one or more of the processes. In one or more embodiments, the steps 402 through 422 may be performed by the vehicle speed control module 130 from FIG. 1.

Several features of the method 400 are similar to the features of the method 300 shown in FIG. 3. For purposes of clarity and conciseness, and not in any limiting manner, the portions of the method 400 that differ from the method 300 will be discussed below. Discussion regarding the remaining features of the method 400 may be found by referencing the discussion above with respect to the corresponding features of the method 300.

In several embodiments, at a step 408 during or after receiving information from the one or more sensors, the processor 136 of the vehicle speed control module 130 determines whether the change in road grade is less than a threshold grade. The processor 136 may make this determination based on the predicted road grade, the detected road grade, or any combination of the predicted and detected road grades. In some examples, the threshold grade may be –3% (i.e., a 3% increase in downhill grade from the current grade of the road on which the vehicle 110 is traveling). The threshold grade provided herein is for example only, and other embodiments may include smaller or larger grades. For example, in some implementations, the threshold grade may be less than –3% (e.g., –2%, –1%, etc.) or greater than –3% (e.g., –4%, –5%, etc.). In several examples, one percent of grade is substantially similar to one degree of grade. Thus, in some examples, a –3% change in road grade is substantially similar to a –3° change in road grade. The relationship between percentage of grade and degree of grade provided herein is for example only, and other embodiments may include different relationships. For example, in some implementations, the one percent of grade is substantially similar to a degree of grade less than one degree (e.g., 0.5°, 0.25°, etc.) or greater than one degree (e.g., 2°, 3°, etc.).

In some embodiments, at a step 410 after determining that the change in road grade is less than the threshold grade, the processor 136 activates the vehicle speed compensation mode (which may also be referred to as the vehicle speed control mode). In several examples, when the vehicle speed compensation mode is activated, the vehicle speed control module 130 continues to monitor the environmental conditions surrounding the vehicle to determine if there are any changes in the grade of the road on which the vehicle 110 is traveling. When a change in road grade is detected, the vehicle speed control module 130 automatically adjusts the load on the power source 115 to maintain the speed of the vehicle 110 during the change in road grade. In examples when the road grade decreases, as illustrated by the embodiment shown in FIG. 4, the processor 136 may automatically decrease the load on the power source 115 to maintain the speed of the output shaft 122, which maintains the speed of the vehicle 110 during the change in the road grade.

In some examples, the processor 136 may additionally or alternatively decrease the load on the power source 115, and thereby maintain the speed of the vehicle 110, by requesting a braking force to be applied in lower gears for vehicles with combustion engines. The processor 136 may additionally decrease the load on the power source 115, and thereby maintain the speed of the vehicle 110, by requesting that regenerative braking be implemented for vehicles with hybrid, electric, and fuel cell engines. The processor 136 may additionally decrease the load on the power source 115, and thereby maintain the speed of the vehicle 110, by requesting the application of brakes of the vehicle 110 along with the illumination of at least one brake light of the vehicle 110. It is to be understood that the processor 136 may decrease the load on the power source 115 in any other suitable manner.

In several examples, at a step 412 while the vehicle speed control mode is activated, the processor 136 determines whether the accelerator pedal 140 is depressed by an amount less than the threshold depression amount. As discussed above, in some examples, the threshold depression amount for the accelerator pedal 140 may be between 15% and 20%. In such examples, the processor 136 continuously monitors the depression amount of the accelerator pedal 140 to determine if the depression amount falls below 15%. If the depression amount remains within the threshold depression amount, the process returns to step 410.

In additional examples, the processor 136 determines whether the brake pedal 150 is depressed by an amount greater than a threshold depression amount. In some examples, because the depression percentage may be represented by a pressure, the threshold depression amount may range from 0.3 MPa to 0.5 MPa. The threshold depression amount provided herein is for example only, and other embodiments may include lower or higher pressures. For example, in some implementations, the threshold depression amount may range from a pressure less than 0.3 MPa to a pressure greater than 0.5 MPa. In other embodiments, the threshold depression amount may range from any other suitable pressures. The processor 136 continuously monitors the depression amount of the brake pedal 150 to determine if the depression amount exceeds 0.5 MPa. If the depression amount remains within the threshold depression amount, the process returns to step 410.

In some embodiments, at a step 414 after determining that the accelerator pedal 140 is depressed by an amount less than the threshold depression amount and/or that the brake pedal 150 has been depressed by an amount greater than the threshold depression amount, the processor 136 deactivates the vehicle speed compensation mode.

In several examples, at a step 416 after determining that the change in road grade is greater than the threshold grade, the processor 136 of the vehicle speed control module 130 determines whether the change is road grade is greater than a second threshold grade. In some embodiments, the second threshold grade is greater than the threshold grade discussed above. For example, if the threshold grade is −3%, the second threshold grade may be −4%. The threshold grade and second threshold grade provided herein are for example only, and other embodiments may include smaller or larger grades. For example, in implementations when the threshold grade is −3%, the second threshold grade may be less than −4% (e.g., −3.5%, −3.75%, etc.) or greater than −4% (e.g., −5%, −6%, etc.).

In some embodiments, at a step 418 after determining that the change in road grade is greater than the second threshold grade, the processor 136 does not activate the vehicle speed control mode. In such embodiments, the change in road grade is too steep to merit activation of the vehicle speed control mode.

In several embodiments, at a step 420 after determining that the change in road grade is less than the second threshold grade, the processor 136 monitors the brake pedal 150 and the speed of the vehicle 110. As discussed above, the processor 136 may monitor the speed of the vehicle 110 by monitoring the speed of the output shaft 122. As further discussed above, the processor 136 may monitor the brake pedal 150 to determine if the brake pedal 150 is depressed and, if so, the amount of such depression. Additionally or alternatively, the processor 136 may monitor whether a braking force is applied to the vehicle 110 in any other manner (e.g., internal braking within the power source 115 of the vehicle 110, the activation of a regenerative braking system of the vehicle 110, etc.).

In some examples, at a step 422 during or after monitoring the brake pedal 150, the processor determines whether the brake pedal 150 has been depressed by any amount. In examples where the brake pedal 150 has not been depressed, the processor 136 does not activate the vehicle speed control mode. In examples where the brake pedal 150 has been depressed, the processor 136 activates the vehicle speed control mode, and the method 400 proceeds to step 410. Additionally or alternatively, in examples where internal braking within the power source 115 of the vehicle 110 has occurred and/or where a regenerative braking system of the vehicle 110 has been activated, the processor 136 activates the vehicle speed control mode, and the method 400 proceeds to step 410.

Figure 5:
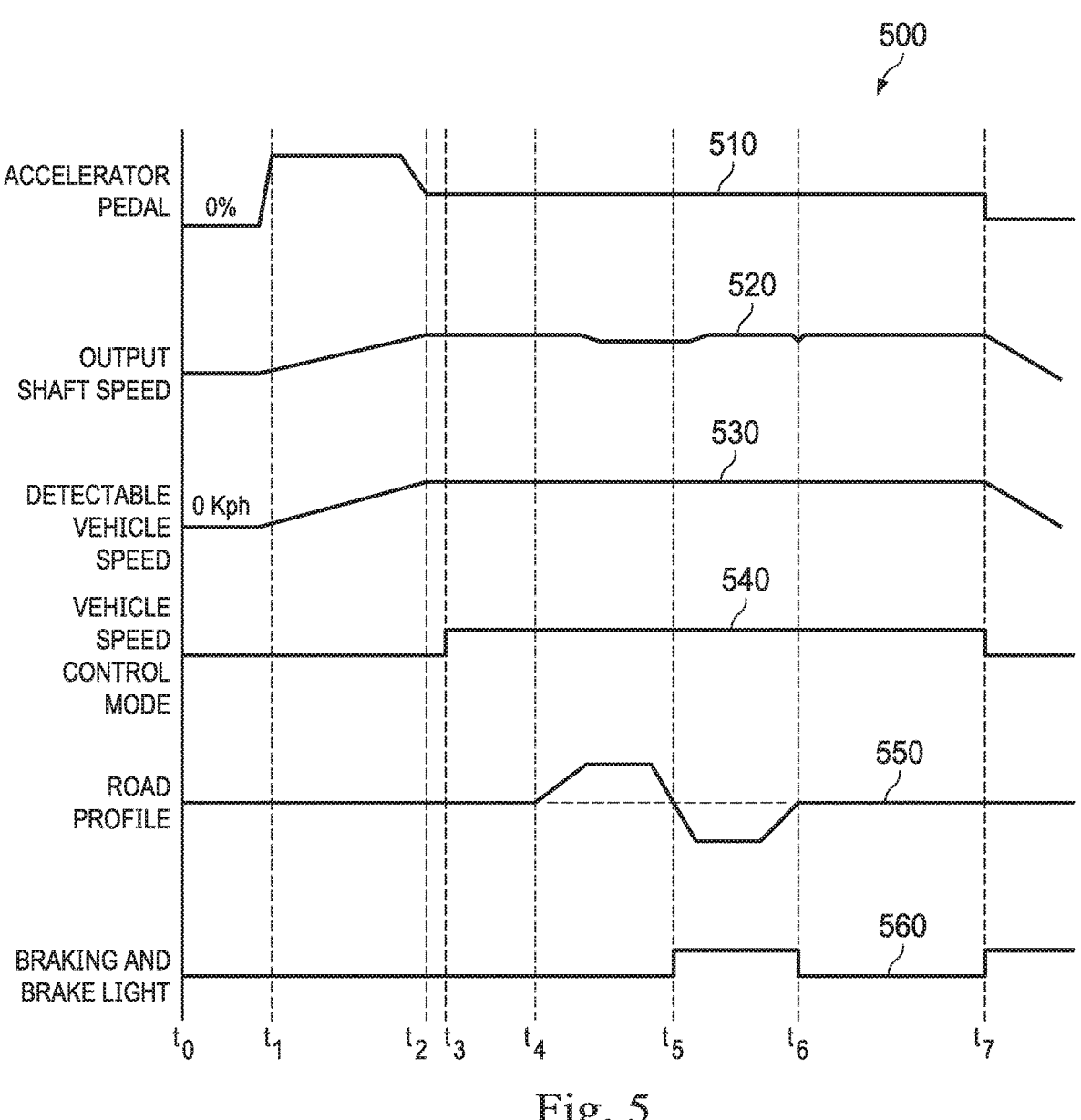
FIG. 5 is a graphical illustration of an operational performance of the system of FIG. 1 according to one or more embodiments of the present disclosure.

FIG. 5 is a graphical illustration of an operational performance of the system of FIG. 1 according to one or more embodiments of the present disclosure. As shown in FIG. 5, a graph 500 illustrates the performance characteristics over time of several features of the system 100 of FIG. 1 as the vehicle 110 travels along a road with changing grade. A line 510 indicates the amount of accelerator pedal depression. A line 520 indicates the speed of the output shaft 122. A line 530 indicates a speed of the vehicle 110, as detected by a driver of the vehicle 110. A line 540 indicates an operational state of the vehicle speed control mode (i.e., whether the vehicle speed control mode is "active" or "inactive"). A line 550 indicates the grade of the road. A line 560 indicates an operational state of braking of the vehicle 110 (i.e., whether the vehicle 110 is being braked or not) and whether or not the brake light of the vehicle 110 is illuminated. In several examples, when the vehicle 110 is being braked, the brake light is illuminated. In some embodiments, the vehicle 110 may be braked by mechanical braking, which may include a depression of the brake pedal 150 of the vehicle 110. In other embodiments, the vehicle 110 may be braked by internal braking within the power source 115 of the vehicle 110. In still other embodiments, the vehicle 110 may be braked by a regenerative braking system of the vehicle 110.

As shown in FIG. 5, between a time t0 and a time t1, the vehicle 110 is not moving—the vehicle speed is 0 kph, and the accelerator pedal 140 is not depressed. At the time t1, the vehicle 110 begins to accelerate. This can be seen by the increase in vehicle speed, output shaft speed, and accelerator pedal depression amount. At a time t2, the vehicle 110 stops accelerating, and the accelerator pedal 140 is maintained at a constant depression amount to allow the vehicle 110 to continue traveling at a constant speed. At a time t3, the vehicle speed control module 130 determines that the accelerator pedal depression amount has been maintained within a threshold depression amount for a threshold time period. Additionally, at the time t3, the vehicle speed control module 130 has determined that the output shaft speed has been maintained within a threshold speed for the threshold time period. The threshold time period is represented by the time between t2 and t3. As discussed above with respect to FIG. 2, in some embodiments, the threshold time period is three seconds. In other embodiments, the threshold time period may be less than or greater than three seconds.

FIG. 5 illustrates that at the time t3, the vehicle speed control mode is activated. In several embodiments, the vehicle speed control mode is activated after the vehicle speed control module 130 determines that the accelerator pedal depression amount has been maintained within the threshold depression amount for the threshold time period and that the output shaft speed has been maintained within the threshold speed for the threshold time period. When the vehicle speed control mode is activated, the vehicle speed control module 130 continues to monitor the environmental conditions surrounding the vehicle to determine if there are any changes in the grade of the road on which the vehicle 110 is traveling. When a change in road grade is detected, the vehicle speed control module 130 automatically adjusts the load on the power source 115 of the vehicle 110 to maintain the speed of the output shaft 122, which maintains the speed of the vehicle 110 during the change in the road grade.

As shown in FIG. 5, at a time t4, the grade of the road begins to increase. Beginning at the time t4, the road grade increases, and then the road grade levels off at a time t5. When the road grade increases, the vehicle 110 will naturally begin to slow down. This will result in a decrease in output shaft speed. Thus, to maintain the speed of the vehicle 110, the vehicle speed control module 130 may increase the load on the power source 115 to maintain the speed of the vehicle 110 to compensate for the natural decrease in output shaft speed shown in FIG. 5. As shown in the graph 500, the line 530 remains constant between the time t4 and the time t5. This indicates that the driver of the vehicle 110 does not detect a decrease in vehicle speed, and the detectable vehicle speed remains constant between the times t4 and t5 due to the speed compensation performed by the vehicle speed control module 130.

As further shown in FIG. 5, at the time t5, the road grade begins to decrease. Beginning at the time t5, the road grade decreases, and then the road grade levels off at a time t6. When the road grade decreases, the vehicle 110 will naturally begin to speed up. This will result in an increase in output shaft speed. Thus, to maintain the speed of the vehicle 110, the vehicle speed control module 130 may decrease the load on the power source 115 to maintain the speed of the vehicle 110 to compensate for the natural increase in output shaft speed shown in FIG. 5. In some embodiments, in addition to decreasing the load on the power source 115, the vehicle speed control module may increase the braking force (which may be a brake pressure, for example) of the vehicle. The braking force may be increased through mechanical braking, which may include increasing a depression amount of the brake pedal 150 of the vehicle 110. The braking force may alternatively or additionally be increased by increasing an amount of internal braking within the power source 115 of the vehicle 110. The braking force may alternatively or additionally be increased by activating a regenerative braking system of the vehicle 110. As shown in the graph 500, the line 530 remains constant between the time t5 and the time t6. This indicates that the driver of the vehicle 110 does not detect an increase in vehicle speed, and the detectable vehicle speed remains constant between the times t5 and t6 due to the speed compensation performed by the vehicle speed control module 130. Additionally, between the times t5 and t6, the line 560 indicates that the vehicle 110 is being braked and that the brake light is illuminated.

At a time t7, as shown in FIG. 5, the accelerator depression amount returns to 0% (i.e., the accelerator pedal 140 is no longer depressed). As a result, the vehicle speed returns to 0 kph. Additionally, because the accelerator pedal 140 is no longer depressed within the threshold depression amount, the vehicle speed control mode is deactivated, as shown by the line 540 in the graph 500. In other embodiments, the vehicle speed control mode may be deactivated when the output shaft speed is no longer maintained within the threshold speed. As further shown at the time t7 in FIG. 5, the line 560 indicates that the vehicle 110 is being braked and that the brake light is illuminated. This may be done to bring the vehicle 110 to a stop.

In several embodiments, a computer system typically includes at least hardware capable of executing machine readable instructions, as well as the software for executing acts (typically machine-readable instructions) that produce a desired result. In several embodiments, a computer system may include hybrids of hardware and software, as well as computer sub-systems.

In several embodiments, hardware generally includes at least processor-capable platforms, such as client-machines (also known as personal computers or servers), and hand-held processing devices (such as smart phones, tablet computers, personal digital assistants (PDAs), or personal computing devices (PCDs), for example). In several embodiments, hardware may include any physical device that is capable of storing machine-readable instructions, such as memory or other data storage devices. In several embodiments, other forms of hardware include hardware sub-systems, including transfer devices such as modems, modem cards, ports, and port cards, for example.

In several embodiments, software includes any machine code stored in any memory medium, such as RAM or ROM, and machine code stored on other devices (such as floppy disks, flash memory, or a CD ROM, for example). In several embodiments, software may include source or object code. In several embodiments, software encompasses any set of instructions capable of being executed on a node such as, for example, on a client machine or server.

In several embodiments, combinations of software and hardware could also be used for providing enhanced functionality and performance for certain embodiments of the present disclosure. In an embodiment, software functions may be directly manufactured into a silicon chip. Accordingly, it should be understood that combinations of hardware and software are also included within the definition of a computer system and are thus envisioned by the present disclosure as possible equivalent structures and equivalent methods.

In several embodiments, computer readable mediums include, for example, passive data storage, such as a random access memory (RAM) as well as semi-permanent data storage such as a compact disk read only memory (CD-ROM). One or more embodiments of the present disclosure may be embodied in the RAM of a computer to transform a standard computer into a new specific computing machine. In several embodiments, data structures are defined organizations of data that may enable an embodiment of the present disclosure. In an embodiment, a data structure may provide an organization of data, or an organization of executable code.

In several embodiments, any networks and/or one or more portions thereof, may be designed to work on any specific architecture. In an embodiment, one or more portions of any networks may be executed on a single computer, local area networks, client-server networks, wide area networks, internets, hand-held and other portable and wireless devices and networks.

In several embodiments, a database may be any standard or proprietary database software, such as Oracle, Microsoft Access, SyBase, or DBase II, for example. In several embodiments, the database may have fields, records, data, and other database elements that may be associated through database specific software. In several embodiments, data may be mapped. In several embodiments, mapping is the process of associating one data entry with another data entry. In an embodiment, the data contained in the location of a character file can be mapped to a field in a second table. In several embodiments, the physical location of the database is not limiting, and the database may be distributed. In an embodiment, the database may exist remotely from the server, and run on a separate platform. In an embodiment, the database may be accessible across the Internet. In several embodiments, more than one database may be implemented.

In several embodiments, a plurality of instructions stored on a computer readable medium may be executed by one or more processors to cause the one or more processors to carry out or implement in whole or in part the above-described operation of each of the above-described systems, methods, and/or any combination thereof. In several embodiments, such a processor may include one or more of any processor (s) that are part of the components of the above-described systems, and/or any combination thereof, and such a computer readable medium may be distributed among one or more components of the above-described systems. In several embodiments, such a processor may execute the plurality of instructions in connection with a virtual computer system. In several embodiments, such a plurality of instructions may communicate directly with the one or more processors, and/or may interact with one or more operating systems, middleware, firmware, other applications, and/or any combination thereof, to cause the one or more processors to execute the instructions.

It is understood that variations may be made in the foregoing without departing from the scope of the present disclosure.

In some embodiments, the elements and teachings of the various embodiments may be combined in whole or in part in some or all of the embodiments. In addition, one or more of the elements and teachings of the various embodiments may be omitted, at least in part, and/or combined, at least in part, with one or more of the other elements and teachings of the various embodiments.

Any spatial references, such as, for example, "upper," "lower," "above," "below," "between," "bottom," "vertical," "horizontal," "angular," "upwards," "downwards," "side-to-side," "left-to-right," "right-to-left," "top-to-bottom," "bottom-to-top," "top," "bottom," "bottom-up," "top-down," etc., are for the purpose of illustration only and do not limit the specific orientation or location of the structure described above.

In some embodiments, while different steps, processes, and procedures are described as appearing as distinct acts, one or more of the steps, one or more of the processes, and/or one or more of the procedures may also be performed in different orders, simultaneously, and/or sequentially. In some embodiments, the steps, processes, and/or procedures may be merged into one or more steps, processes, and/or procedures.

In some embodiments, one or more of the operational steps in each embodiment may be omitted. Moreover, in some instances, some features of the present disclosure may be employed without a corresponding use of the other features. Moreover, one or more of the above-described embodiments and/or variations may be combined in whole or in part with any one or more of the other above-described embodiments and/or variations.

Although some embodiments have been described in detail above, the embodiments described are illustrative only and are not limiting, and those skilled in the art will readily appreciate that many other modifications, changes, and/or substitutions are possible in the embodiments without materially departing from the novel teachings and advantages of the present disclosure. Accordingly, all such modifications, changes, and/or substitutions are intended to be included within the scope of this disclosure as defined in the following claims. In the claims, any means-plus-function clauses are intended to cover the structures described herein as performing the recited function and not only structural equivalents, but also equivalent structures. Moreover, it is the express intention of the borrower not to invoke 35 U.S.C. § 112, paragraph 6 for any limitations of any of the claims herein, except for those in which the claim expressly uses the word "means" together with an associated function.

What is claimed is:

1. A system for dynamically maintaining a vehicle speed during a change in road grade, the system comprising:
   a first sensor configured to detect an amount of depression of an accelerator pedal of a vehicle;
   a second sensor configured to monitor the vehicle speed; and
   a vehicle speed control module including a processor, and in the absence of receiving a user input for maintaining the vehicle speed, the processor configured to:
   receive, from the first sensor, an indication that the accelerator pedal is depressed;
   receive, from the second sensor, an indication of the vehicle speed;
   determine that the accelerator pedal has been depressed within a threshold depression amount for a threshold time period;
   determine that the vehicle speed has been maintained within a threshold speed for the threshold time period;
   determine whether the change in the road grade is less than a threshold grade; and
   activate a vehicle speed control mode to automatically adjust a load on a power source of the vehicle to maintain the vehicle speed during the change in the road grade based on:
   the determination that the accelerator pedal has been depressed within the threshold depression amount for the threshold time period; and
   a determination that the change in the road grade is less than the threshold grade.

2. The system of claim 1, wherein the processor is further configured to:
   receive, from the first sensor, a subsequent indication that the accelerator pedal has been depressed greater than the threshold depression amount; and
   based on the received subsequent indication, stop automatically adjusting the load on the power source, wherein adjusting the load on the power source maintains the vehicle speed during the change in the road grade.

3. The system of claim 1, wherein the processor is further configured to:

based on a determination that the change in the road grade is greater than the threshold grade, determine whether the change in the road grade is greater than a second threshold grade, the second threshold grade being greater than the threshold grade.

4. The system of claim 3, wherein the processor is further configured to:

based on the determination that the change in the road grade is greater than the second threshold grade, refrain from automatically adjusting the load on the power source of the vehicle to maintain the vehicle speed during the change in the road grade.

5. The system of claim 3, wherein the processor is further configured to:

based on a determination that the change in the road grade is less than the second threshold grade, determine whether a subsequent indication is received from the first sensor that the accelerator pedal is depressed, and automatically adjust the load on the power source to maintain the vehicle speed during the change in the road grade.

6. The system of claim 1, wherein the processor is further configured to:

based on the determination that the change in the road grade is greater than the threshold grade, automatically adjust the load on the power source to maintain the vehicle speed during the change in the road grade.

7. The system of claim 1, wherein the vehicle further comprises a third sensor configured to measure the road grade, and wherein determining whether the change in the road grade is less than the threshold grade comprises:

detecting a location of the vehicle using GPS data;

determining the road grade at the location of the vehicle from the GPS data; and supplementing the determined road grade from the GPS data with a measured road grade from the third sensor to determine a composite road grade measurement.

8. The system of claim 1, wherein automatically adjusting the load on the power source comprises:

determining that the change in the road grade is a positive change; and automatically increasing the load on the power source to maintain the vehicle speed.

9. The system of claim 1, wherein automatically adjusting the load on the power source comprises:

determining that the change in the road grade is a negative change; and automatically decreasing the load on the power source to maintain the vehicle speed.

10. The system of claim 1, wherein automatically adjusting the load on the power source further comprises automatically adjusting a braking force applied to the vehicle to maintain the vehicle speed.

11. The system of claim 1, further comprising a server configured to store information related to the road grade detected at different locations along a road, wherein the processor is further configured to:

monitor changes in the vehicle speed in real time;

compare the changes in the vehicle speed with the detected road grade at the different locations along the road to verify an accuracy of the detected road grade; and based on the comparison, transmit updated road grade information to the server.

12. A system for dynamically maintaining a vehicle speed during a change in road grade, the system comprising:

a server configured to store information related to the road grade detected at different locations along a road; and a vehicle comprising:

a first sensor configured to detect an amount of depression of an accelerator pedal of the vehicle;

a second sensor configured to monitor the vehicle speed; and a vehicle speed control module including a processor, and in the absence of receiving a user input for maintaining the vehicle speed, the processor configured to:

determine that the accelerator pedal has been depressed within a threshold depression amount for a threshold time period;

determine that the vehicle speed has been maintained within a threshold speed for the threshold time period;

determine whether the change in road grade is less than a threshold grade;

activate a vehicle speed control mode to automatically adjust a load on a power source of the vehicle to maintain the vehicle speed during the change in the road grade based on:

the determination that the accelerator pedal has been depressed within the threshold depression amount for the threshold time period;

monitor changes in the vehicle speed in real time; and a determination that the change in the road grade is less than the threshold grade;

compare the changes in the vehicle speed with the detected road grade at the different locations along the road to verify an accuracy of the detected road grade; and based on the comparison, transmit updated road grade information to the server.

13. The system of claim 12, wherein the processor is further configured to determine whether the change in the road grade is less than a threshold grade.

14. The system of claim 13, wherein the processor is further configured to:

based on a determination that the change in the road grade is greater than the threshold grade, determine whether the change in the road grade is greater than a second threshold grade, wherein the second threshold grade is greater than the threshold grade.

15. The system of claim 14, wherein the processor is further configured to:

based on a determination that the change in the road grade is less than the second threshold grade, determine whether a subsequent indication is received from the first sensor that the accelerator pedal is depressed; and based on a determination that the subsequent indication is received from the first sensor, automatically adjust the load on the power source to maintain the vehicle speed during the change in the road grade.

16. A method for dynamically maintaining a vehicle speed during a change in road grade in the absence of receiving a user input for maintaining the vehicle speed, the method comprising:

receiving, from a first sensor of a vehicle, an indication that an accelerator pedal of the vehicle is depressed;

determining, by a processor of a vehicle speed control module, that the accelerator pedal has been depressed within a threshold depression amount for a threshold time period;

receiving, from a second sensor of the vehicle, an indication of the vehicle speed;

determining, by the processor, that the vehicle speed has been maintained within a threshold speed for the threshold time period;

determining, by the processor, whether the change in the road grade is less than a threshold grade; and activating, by the processor, a vehicle speed control mode to automatically adjust a load on a power source of the vehicle to maintain the vehicle speed during the change in the road grade based on:

the determination that the accelerator pedal has been depressed within the threshold depression amount for the threshold time period; and a determination that the change in the road grade is less than the threshold grade.

17. The method of claim 16 further comprising:

receiving, from the first sensor, a subsequent indication that the accelerator pedal has been depressed greater than the threshold depression amount; and based on the received subsequent indication, stopping, by the processor, the automatic adjusting of the load on the power source, wherein adjusting the load on the power source maintains the vehicle speed during the change in the road grade.

18. The method of claim 16 further comprising:

based on a determination that the change in the road grade is greater than the threshold grade, determining, by the processor, whether the change in the road grade is greater than a second threshold grade, wherein the second threshold grade is greater than the threshold grade.

19. The method of claim 16 further comprising:

storing, by a server, information related to the road grade detected at different locations along a road;

monitoring, by the processor, changes in the vehicle speed in real time;

comparing, by the processor, the changes in the vehicle speed with the detected road grade at the different locations along the road to verify an accuracy of the detected road grade; and based on the comparison, transmitting updated road grade information to the server.

* * * * *